United States Patent [19]
Taketani et al.

[11] Patent Number: 4,873,030
[45] Date of Patent: Oct. 10, 1989

[54] METHOD OF MOLDING A RESINOUS OPTICAL TRANSMITTING ELEMENT

[75] Inventors: Noriaki Taketani, Katsuta; Hideki Asano; Akira Endo, both of Mito; Tomiya Abe, Hitachi; Masahiko Ibamoto, Katsuta; Junji Mukai, Hitachi; Seikichi Tanno, Hitachi; Shuji Eguchi, Hitachi; Masato Shimura, Hitachi, all of Japan

[73] Assignees: Hitachi, Ltd.; Hitachi Cable, Ltd., both of Tokyo, Japan

[21] Appl. No.: 214,463

[22] Filed: Jul. 1, 1988

[30] Foreign Application Priority Data

Jul. 6, 1987 [JP] Japan .................. 62-166797

[51] Int. Cl.⁴ .................. B29D 11/00; G02B 6/16
[52] U.S. Cl. .................. 264/1.5; 264/1.7; 350/96.30; 425/808; 427/117; 427/163
[58] Field of Search .................. 264/1.5, 1.7; 425/808; 350/96.30, 96.29; 427/117, 163

[56] References Cited

U.S. PATENT DOCUMENTS

| | | | |
|---|---|---|---|
| 4,208,363 | 6/1980 | Yerich | 264/1.5 |
| 4,688,884 | 8/1987 | Scifres et al. | 350/96.3 |
| 4,699,451 | 10/1987 | Mohr | 350/96.29 |
| 4,724,316 | 2/1988 | Morton | 350/96.29 |

FOREIGN PATENT DOCUMENTS

| | | | |
|---|---|---|---|
| 45502 | 3/1982 | Japan . | |
| 149008 | 9/1983 | Japan | 264/1.5 |
| 14607 | 1/1986 | Japan . | |
| 26012 | 2/1986 | Japan . | |

Primary Examiner—James Lowe
Attorney, Agent, or Firm—Antonelli, Terry & Wands

[57] ABSTRACT

There is provided a resinous optical transmitting element in which a core, through which light is transmitted, is formed into a predetermined non-linear configuration, and a cladding lower in refractive index than the core is in close contact with the core. A method of manufacturing the optical transmitting element comprises the steps of polymerizing polymeric material forming the core, within a mold having a predetermined non-linear cavity, subsequently removing the mold, and forming the cladding about the core. The resinous optical transmitting element obtained by the method can be formed into a selected one of various configurations in compliance with the purpose. In addition, the resinous optical transmitting element is less in distortion, making it possible to reduce the transmission loss.

11 Claims, 5 Drawing Sheets

METHOD OF MOLDING A RESINOUS OPTICAL TRANSMITTING ELEMENT

BACKGROUND OF THE INVENTION

1. Field of the Invention

The present invention relates to optical transmitting elements having their respective configurations in compliance with various purposes respectively and, more particularly, to a resinous optical transmitting element which is low in transmission loss and suitable for communication over short distances and to a method of manufacturing the optical transmitting element.

2. Description of the Prior Art

As disclosed, for example, in Japanese Patent Application Laid-Open Nos. 61-26012 and 61-14607, a conventional optical transmitting element is processed into a curled configuration or the like after the element has been molded. Further, in an optical transmitting element disclosed in Japanese Patent Application Laid-Open No. 57-45502, a cladding lower in refractive index than a core through which light is transmitted, is formed into a tube, and core material is poured into the tube. The poured core material is polymerized so that the core and the cladding are united to each other, to form an optical transmitting element.

In the prior art described above, no consideration is made to a distortion within the optical transmitting element, which occurs due to post-processing of the optical transmitting element. By this reason, there arise such problems that the distortion causes the transmission loss to increase, and the surface roughness of an interface between the core and the cladding is coarse thereby making it impossible to reduce the transmission loss.

Moreover, in a method of obtaining an optical transmitting element by means of cast molding, a tube is utilized, as it is, as a cladding. According to this method, the cladding material employs fluoric resin because the cladding material is required to have a low refractive index. Since, however, the fluoric resin is high in molding temperature and is inferior in moldability, there arises such a problem that it is impossible for the fluoric resin to mold articles complicated in configuration. Furthermore, in the method in which the tube is molded and the core material is put into the tube and is polymerized, the transmission loss occurs because of the surface roughness of the inner surface of the tube. Further, in the prior art method, no consideration is made to molding of a graded-index (GI type) in which the refractive index of the optical transmitting section, i.e., the core is in the form of a quadratic distribution.

SUMMARY OF THE INVENTION

It is an object of the invention to provide a resinous optical transmitting element and a method of manufacturing the same, in which it is possible to obtain the optical transmitting element having a predetermined configuration in compliance with a selected one of various purposes, and the optical transmitting element is low in distortion and is reduced in transmission loss.

The above object is achived by such an arrangement that a mold having a predetermined configuration is employed to cast-mold a core within the mold, the mold is removed and, subsequently, the core is covered with a cladding. In this case, both the core and the cladding can employ either of cross-linking resin and non-cross-linking resin (thermoplastic resin). Material which is excellent in moldability can be selected for the mold, because the material of the mold does not exert an influence upon the characteristic of the optical transmitting element in particular after having been molded. In this connection, it is preferable that the mold is formed of material easy to be removed, in consideration of subsequent steps.

In an optical transmitting element comprising a core through which light is transmitted, and a cladding lower in refractive index than the core, a first invention is characterized in that the core is formed into a predetermined non-linear configuration, and the cladding is in close contact with the core.

In a method of manufacturing an optical transmitting element comprising a core through which light is transmitted, and a cladding which is lower in refractive index than the core, a second invention is characterized by comprising the steps of polymerizing polymeric material forming the core, within a mold having a predetermined non-linear cavity, subsequently removing the mold, and forming and cladding about the core.

The core material may be cast-molded and polymerized within the mold having a curled configuration or a spiral configuration, or within the mold having a curved configuration, or within the mold gradually decreasing in cross-sectional area as a forward end of the mold is approached from a rear end thereof, or within the mold in which at least a part of the mold has a polygonal shape in cross-sectional area, or within the mold in which at least a part of the mold has an elliptical shape in cross-sectional area, or within the mol in which the refractive index varies in the form of a quadratic curve from a center of the core toward the cladding.

Moreover, the optical transmitting element may be manufactured in such a manner that the core material is cast-molded and polymerized within a mold, the mold is subsequently removed, and the cladding is formed in close contact with the core, the cladding having, in at least a part thereof, foam, or the cladding having therein an electric transmitting element, or the cladding having such a structure that at least a part of the cladding permits light to leak to the outside, or the cladding having at least one projecting structure required for connection.

It is desirable that the material of the core is cross-linking resin, in consideration of heat resistance. In particular, acrylic resin or styrene resin is excellent for the core material. Further, fluoric resin is excellent for the material of the cladding.

The mold formed of good material in moldability can be formed into various configurations. For example, it is possible to form the mold into a curled configuration having a diameter equal to or less than 5 mm. When the core material is cast-molded into the mold, there is provided a core having a predetermined configuration without occurrence of a distortion. When the core is covered with a cladding, there is provided an optical transmitting element. In this case, if the cross-linking resin is employed, there is obtained the optical transmitting element excellent in heat resistance and also good in shape retaining ability.

The optical transmitting element can freely select its configuration in compliance with the purpose, by varying the configuration of the mold. The optical transmitting element formed into a curled code fiber is suitable for instruments in which the transmitting distances vary, such as robots or machine tools. In this case, the configuration of the mold should be brought to a spiral form. Further, if the optical transmitting element is used as a sensor for minute parts, the forward end of the mold should be reduced in diameter. Moreover, if the cladding is molded in compliance with various purposes, it is possible to increase the range of use of the optical transmitting element. For example, if the optical transmitting element is formed in part into a structure permitting light to leak, there can be obtained the optical transmitting element for display. Furthermore, if the cladding is partially foamed, it is possible to obtain the optical transmitting element which is strong for lateral pressure.

In the resinous optical transmitting element according to the invention, the core material is cast-molded and polymerized within the mold having any configuration in compliance with the purpose of use, and the cast core material is used, as it is, as the core. Accordingly, a distortion is hard to appear in the core, making it possible to remarkably reduce the transmission loss. Further, the core formed by polymerization of the cross-linking resin is in particular excellent in the shape retaining ability of the molded article.

According to the invention, it is possible to obtain the resinous optical transmitting element which is less in transmission loss and which has a selected one of various configurations in compliance with the purpose. For example, the optical transmitting element having the cladding provided with at least one light-leakage section can be used for display. The optical transmitting element having the cladding at least partially provided with foam can be employed for a use which requires resistance to lateral pressure. The optical transmitting element having the cladding provided with at least one projecting structure can be employed as one which is connectable anywhere. Moreover, the resinous optical transmitting element having the core and the cladding which are formed by the use of cross-linking resin is excellent in heat resistance and also excellent in shape retaining ability.

DETAILED DESCRIPTION OF THE PREFERRED EMBODIMENTS

Various embodiments of the invention will be described with reference to the accompanying drawings.

First Embodiment

Figure 1:
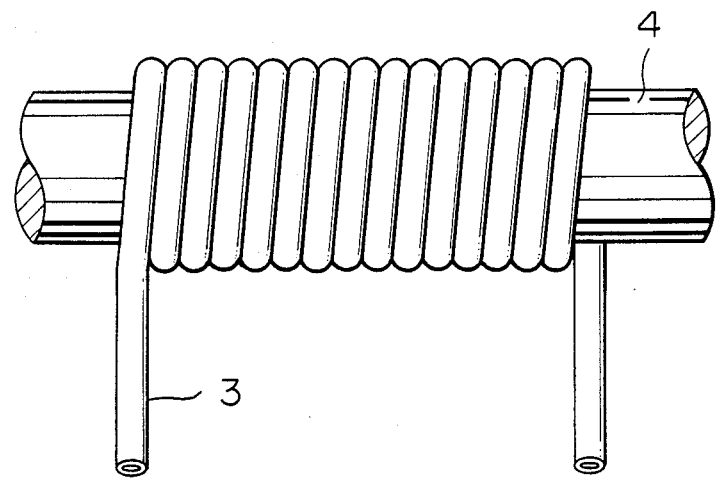
FIGS. 1 and 2 are perspective views of a curled code fiber according to a first embodiment of the invention.
Figure 2:
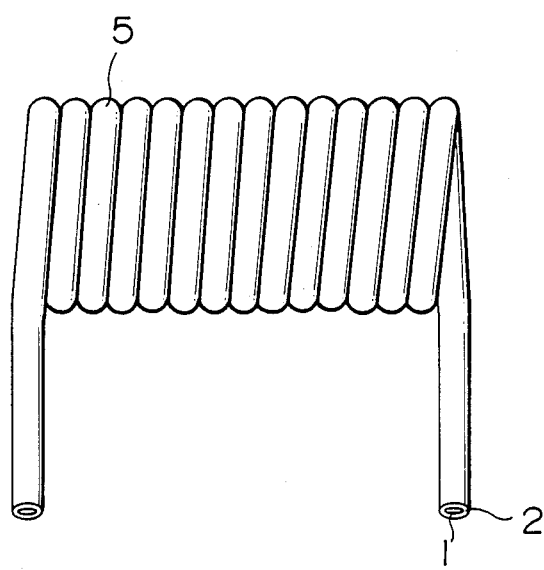

Referring to FIGS. 1 and 2, as material of a core 1, a composition was used which consisted of 70 weight parts of methyl methacrylate, 20 weight parts of ethylene glycol, and 10 weight parts of butyl acrylate. As a polymerization initiator, a composition was used which consisted of 0.5 weight parts of lauroyl peroxide. Fluoric resin was used as material of a cladding 2. Further, a core forming mold 3 employed polyethylene.

First of all, a tube having an inner diameter of 1 mm was employed as the core forming mold 3 and was wound, into a curled configuration, round a rod 4 having an outer diameter of 10 mm. The core 1 was forced into the curled mold 3, and was polymerized at temperature of 120 degrees centigrade. Subsequently, the core forming mold 3 was removed, and the core 1 was covered with the cladding 2. In this manner, a curled code fiber capable of freely expanding and contracting was obtained.

Second Embodiment

Figure 3:
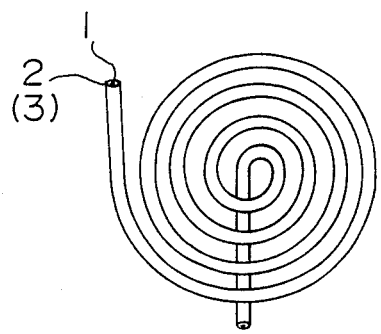
FIG. 3 is a front elevational view of a spiral fiber according to a second embodiment.

As shown in FIG. 3, the core 1, the cladding 2 and the core forming mold 3 were used which were identical in composition with the first embodiment.

A tube was concentrically coiled into a spiral shape, to form the core forming mold 3. The core material was forced into the spiral mold 3 and was polymerized at temperature of 120 degrees centigrade. Subsequently, the core forming mold 3 was removed, and the core 1 was covered with the cladding 2. In this manner, there was obtained an optical transmitting element having a spiral configuration, which was variable in transmission loss in response to rotation of the element. This element can be utilized as a rotational angle sensor.

Third Embodiment

Figure 4:
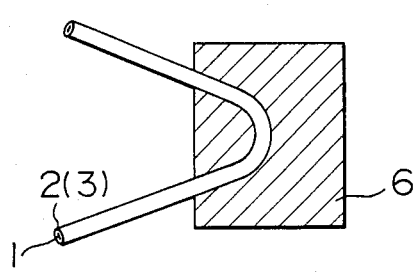
FIG. 4 is a cross-sectional view of a bent fiber and a mold therefor according to a third embodiment.

As shown in FIG. 4, the core 1, the cladding 2 and the core forming mold 3 were used which were identical in composition with the first embodiment.

A tube serving as the core forming mold 3 was put into a mold 6 having a bend radius of 2 mm. The core 1 was forced into the bent core forming mold 3 and was polymerized at temperature of 120 degrees centigrade. Subsequently, the core forming mold 3 was removed, and the core 1 was covered with the cladding 2. In this manner, there was obtained a bent optical transmitting element. The bent section leaks light passing through the optical transmitting element. Utilization of such leakage of light makes it possible to form a coupler.

Fourth Embodiment

Figure 5:
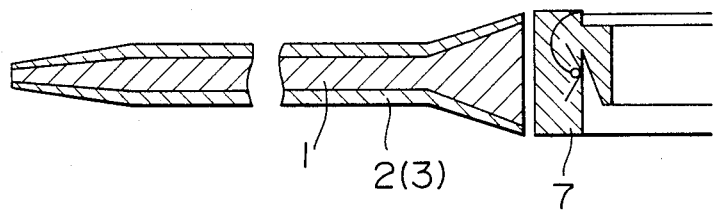
FIG. 5 is a cross-sectional view of a tapering fiber according to a fourth embodiment.

As shown in FIG. 5, the core 1, the cladding 2 and the core forming mold 3 were used which were identical in composition with the first embodiment.

The core forming mold 3 was formed into a configuration in which one end of the mold 3 was smaller in diameter than the other end. The core material was forced into the core forming mold 3, and was polymerized at temperature of 120 degrees centigrade. Subsequently, the core forming mold 3 was removed, and the core 1 was covered with the cladding 2. In this manner, there was obtained an optical transmitting element which could be connected directly to a light source 7 of an LED (light emitting diode) and which could be used for minute parts. In general, when light is introduced into an optical transmitting element from the light source 7 of the LED, optical parts such as lenses or the like are required. According to the optical transmitting element illustrated in FIG. 5, however, it is possible to introduce the light efficiently into the optical transmitting element without the use of these optical parts. Further, it is also possible for the optical transmitting element to transmit the lgith to minute parts.

Fifth Embodiment

Figure 6:
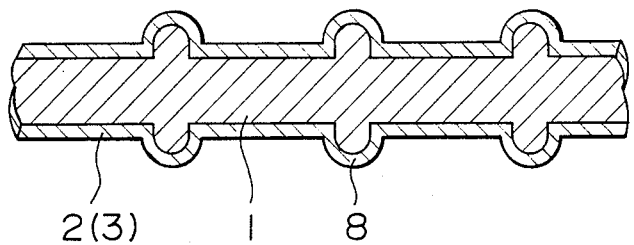
FIG. 6 is a cross-sectional view of an optical transmitting element according to a fifth embodiment.

As shown in FIG. 6, the core 1, the cladding 2 and the core forming mold 3 were used which were identical in composition with the first embodiment.

The core forming mold 3 was provided with a plurality of portions 8 larger in diameter than the remaining portion. The core 1 was forced into the core forming mold 3, and was polymerized at temperature of 120 degrees centigrade. Subsequently, the core forming mold 3 was removed, and the core 1 was covered with the cladding 2. In this manner, there was obtained a bent optical transmitting element. By doing so, light leaks from the large-diameter portions 8, so that optical transmitting element can be used for ornament or display.

Sixth Embodiment

Figure 7:
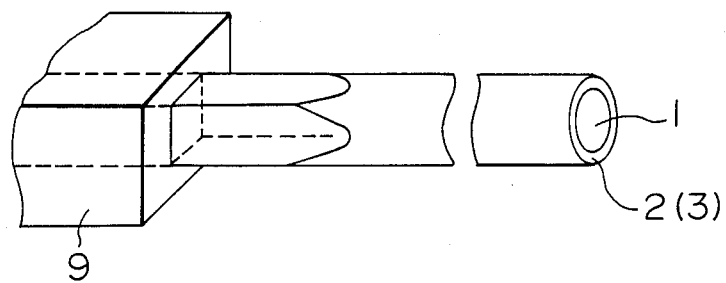
FIG. 7 is a perspective view of an optical transmitting element according to a sixth embodiment.

As shown in FIG. 7, the core 1, the cladding 2 and the core forming mold 3 were used which were identical in composition with the first embodiment.

The core forming mold 3 was used in which one end thereof was circular in cross-section and the other end is square in cross-section. The core 1 was forced into the core forming mold 3, and was polymerized at temperature of 120 degrees centigrade. Subsequently, the core forming mold 3 was removed, and the core 1 was covered with the cladding 2. In this manner, there was obtained an optical transmitting element which could be connected directly to a light-branch optocoupler 9. In general, when light is introduced into the light-branch optocoupler 9, exclusive optical parts are required because the light-branch optocoupler 9 is square in cross-section. According to the optical transmitting element illustrated in FIG. 7, however, it is possible to introduce the light efficiently into the light-branch optocoupler 9 without the use of these optical parts.

Seventh Embodiment

Figure 8:
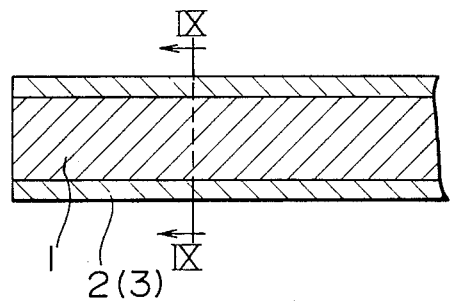
FIG. 8 is a cross-sectional view of an optical transmitting element according to a seventh embodiment.
Figure 9:
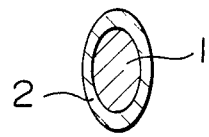
FIG. 9 is a cross-sectional view taken along line IX—IX in FIG. 8.

As shown in FIGS. 8 and 9, the core 1, the cladding 2 and the core forming mold 3 were used which were identical in composition with the first embodiment.

The core forming mold 3 was formed into such a configuration that one end of the mold 3 was circular in cross-section and the other end was elliptical in cross-section. The core 1 was forced into the core forming mold 3, and was polymerized at temperature of 120 degrees centigrade. Subsequently, the core forming mold 3 was removed, and the core 1 was covered with the cladding 2. In this manner, there was obtained an optical transmitting element having a forward end which was elliptical in cross-section. By the use of the optical transmitting element, it is possible to form a circular light on a surface of an object, even if the light is obliquely incident upon the surface of the object. Accordingly, if the optical transmitting element is used in read-out and write for an optical disc, a pit can be reduced in configuration. This makes it possible to incrase the packing density.

Eighth Embodiment

Figure 10:
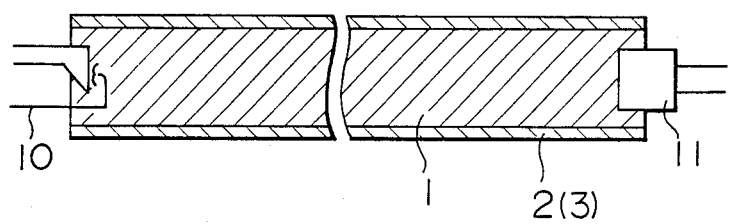
FIG. 10 is a cross-sectional view of an optical transmitting element according to an eighth embodiment.

As shown in FIG. 10, the core 1, the cladding 2 and the core forming mold 3 were used which were identical in composition with the first embodiment.

At least one of the light emitting element 10 and a light receiving 11 was put into the core forming mold 3. The core material was forced into the core forming mold 3, and was polymerized at temperature of 120 degrees centigrade. Subsequently, the core forming mold 3 was removed, and the core 1 was covered with the cladding 2. In this manner, there was obtained an optical transmitting element having incorporated therein at least one of the light emitting element 10 and the light receiving element 11. In the optical transmitting element, the light emitting element 10 and/or the light receiving element 11 can be united to the optical transmitting element.

Ninth Embodiment

Figure 11:
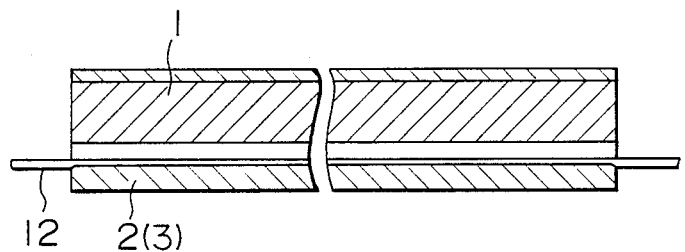
FIG. 11 is a cross-sectional view of an optical transmitting element according to a ninth embodiment.

As shown in FIG. 11, the core 1, the cladding 2 and the core forming mold 3 were used which were identical in composition with the first embodiment.

The core 1 was forced into the core forming mold 3, and was polymerized at temperature of 120 degrees centigrade. Subsequently, the core forming mold 3 was removed, and the core 1 was covered with the cladding 2 having therein an electric transmitting line 12. In this manner, there was obtained an optical transmitting element which could simultaneously transmit light and electricity.

Tenth Embodiment

Figure 12:
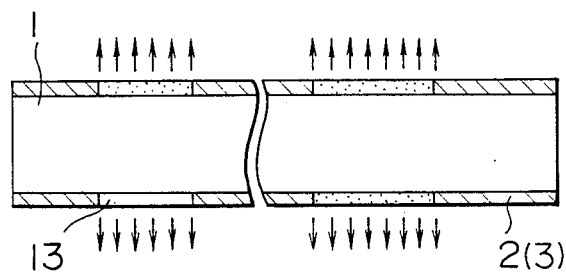
FIG. 12 is a cross-sectional view of an optical transmitting element according to a tenth embodiment.

As shown in FIG. 12, the core 1, the cladding 2 and the core forming mold 3 were used which were identical in composition with the first embodiment.

The core 1 was forced into the core forming mold 3, and was polymerized at temperature of 120 degrees centigrade. Subsequently, the core forming mold 3 was removed, and the core 1 was covered with the cladding 2 permitting light to leak from predetermined portions 13. In this manner, there was obtained an optical transmitting element in which the leaking light was utilized to enable the optical transmitting element to be used for display or ornament.

Eleventh Embodiment

Figure 13:
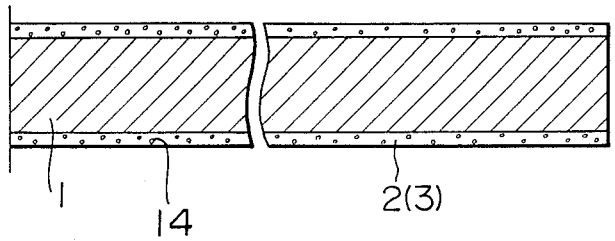
FIG. 13 is a cross-sectional view of an optical transmitting element according to an eleventh embodiment.

As shown in FIG. 13, the core 1, the cladding 2 and the core forming mold 3 were used which were identical in composition with the first embodiment.

The core 1 was forced into the core forming mold 3, and was polymerized at temperature of 120 degrees centigrade. Subsequently, the core forming mold 3 was removed, and the core 1 was covered with the cladding 2 which was in part foamed at 14. In this manner, there was obtained an optical transmitting element which was strong for lateral pressure.

Twelfth Embodiment

Figure 14:
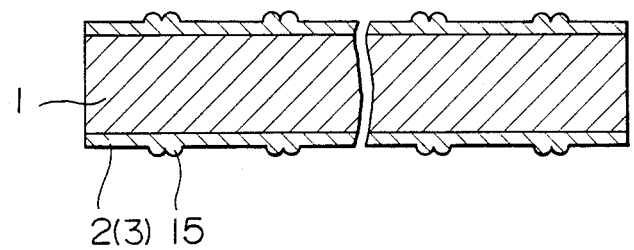
FIG. 14 is a cross-sectional view of an optical transmitting element according to a twelfth embodiment.

As shown in FIG. 14, the core 1, the cladding 2 and the core forming mold 3 were used which were identical in composition with the first embodiment.

The core material was forced into the core forming mold 3, and was polymerized at temperature of 120 degrees centigrade. Subsequently, the core forming mold 3 was removed, and the core 1 was covered with the cladding 2 which had at least one projecting structure 15 required for connection. In this case, if the cladding 2 is provided with a plurality of projecting structures 15 which are equidistantly spaced from each other, the projecting structures 15 serve as standards for the transmission loss, so that convenience further increases. In this manner, there was obtained an optical transmitting element which was connectable at once at requisite locations.

What is claimed is:

1. A method of manufacturing a resinous optical transmitting element comprising a core through which light is transmitted, and a cladding which is lower in refractive index than said core, said method comprising the steps of polymerizing polymeric material forming said core, within a mold having a predetermined nonlinear cavity, subsequently removing said mold, and forming said cladding about said core.

2. A method of manufacturing a resinous optical transmitting element, according to claim 1, including the steps of cast-molding and polymerizing said core material within said mold having one of a curled configuration and a spiral configuration, subsequently removing said mold, and molding said cladding.

3. A method of manufacturing a resinous optical transmitting element, according to claim 1, including the steps of cast-molding and polymerizing said core material within said mold having a bent configuration, subsequently removing said mold, and forming said cladding.

4. A method of manufacturing a resinous optical transmitting element, according to claim 1, including the steps of cast-molding and polymerizing said core material within said mold having a cross-sectional area gradually decreasing as a forward end of said mold is approached from a rear end thereof.

5. A method of manufacturing a resinous optical transmitting element, according to claim 1, including the steps of cast-molding and polymerizing said core material within said mold having at least a part thereof whose cross-sectional area has a polygonal configuration.

6. A method of manufacturing a resinous optical transmitting element, according to claim 1, including the steps of cast-molding and polymerizing said core material within said mold having at least a part thereof whose cross-sectional area has an elliptical configuration.

7. A method of manufacturing a resinous optical transmitting element, according to claim 1, including the steps of cast-molding and polymerizing said core material within said mold in such a manner that a refractive index varies in the form of a quadratic curve from a center of said core toward said cladding.

8. A method of manufacturing a resinous optical transmitting element, according to claim 1, including the steps of cast-molding and polymerizing said core material within said mold, subsequently removing said mold, and forming said cladding having, in at least a part thereof, foam.

9. A method of manufacturing a resinous optical transmitting element, according to claim 1, including the steps of cast-molding and polymerizing said core material within said mold, subsequently removing said mold, and forming said cladding having therein an electric transmitting element.

10. A method of manufacturing a resinous optical transmitting element, according to claim 1, including the steps of cast-molding and polymerizing said core material within said mold, subsequently removing said mold, and forming said cladding having a structure in which at least a part of said cladding permits light to leak to the outside.

11. A method of manufacturing a resinous optical transmitting element, according to claim 1, including the steps of cast-molding and polymerizing said core material within said mold, subsequently removing said mold, and forming said cladding having at least one projecting structure required for connection.

* * * * *